(12) United States Patent
Shumway (10) Patent No.: US 11,794,193 B2
(45) Date of Patent: Oct. 24, 2023

(54) SYSTEM TO CONTROL PARAMETERS OF A MILL

(71) Applicant: Sheldon Dean Shumway, Pleasant Grove, UT (US)

(72) Inventor: Sheldon Dean Shumway, Pleasant Grove, UT (US)

(*) Notice: Subject to any disclaimer, the term of this patent is extended or adjusted under 35 U.S.C. 154(b) by 127 days.

(21) Appl. No.: 17/273,730

(22) PCT Filed: Sep. 2, 2019

(86) PCT No.: PCT/US2019/049258
§ 371 (c)(1),
(2) Date: Mar. 5, 2021

(87) PCT Pub. No.: WO2021/045720
PCT Pub. Date: Mar. 11, 2021

(65) Prior Publication Data
US 2022/0297133 A1    Sep. 22, 2022

(51) Int. Cl.
*B02C 17/18* (2006.01)
*B02C 25/00* (2006.01)
*H02K 19/18* (2006.01)

(52) U.S. Cl.
CPC .......... *B02C 17/1805* (2013.01); *B02C 25/00* (2013.01); *H02K 19/18* (2013.01); *H02K 2213/12* (2013.01)

(58) Field of Classification Search
CPC ..... B02C 25/00; B02C 17/1805; G05B 11/01; G05B 11/06; G05B 11/32
USPC .......... 241/33, 34, 35; 702/57, 141
See application file for complete search history.

(56) References Cited

U.S. PATENT DOCUMENTS

| 6,874,364 B1* | 4/2005 | Campbell | G01N 29/046 73/659 |
| 2010/0024518 A1* | 2/2010 | Radziszewski | G01K 13/00 702/150 |
| 2010/0033035 A1* | 2/2010 | Hosle | B02C 17/24 310/67 R |
| 2017/0036213 A1* | 2/2017 | Pirttiniemi | B02C 25/00 |

FOREIGN PATENT DOCUMENTS

WO    WO-2015166139 A1 * 11/2015    ......... B02C 17/1805

* cited by examiner

*Primary Examiner* — Bobby Yeonjin Kim
(74) *Attorney, Agent, or Firm* — Outer Space IP (57) ABSTRACT

A system to measure and control real-time parameters of a mill for grinding particulate without using auxiliary energy is disclosed. Sensors connected to the mill produce signals. A signal transmitting and receiving module is connected to the sensors and receives and transmits the mill process signals to a network. A modular power generator unit powers the system. A radio antenna receives and transmits signals from and to the signal transmitting and receiving module. A master controller connects to the network and to a distributed control system to receive and use process variables and the signals to compute and transmit setpoints to the distributed control system. The system alarms for upsets conditions, alters mill control variables, or both.

20 Claims, 6 Drawing Sheets

- INSTALLING ONTO THE ROTATABLE MILL SHELL A PLURALITY OF BRACKET HANGERS, EACH BRACKET HANGER CONNECTED TO A MILL FLANGE BOLT THAT IS PREEXISTING ON THE ROTATABLE MILL SHELL — 100
- INSTALLING A BRACKET WITH THE AT LEAST ONE ELECTROMAGNETIC COIL MOUNTED THERETO TO THE BRACKET HANGERS ON THE ROTATABLE MILL SHELL — 102
- ATTACHING THE POWER CONDITIONING UNIT TO THE BRACKET — 104
- ATTACHING THE WIRELESS ANTENNA AND THE SIGNAL RECEIVER MODULE TO THE BRACKET — 106
- INSTALLING THE AT LEAST ONE ACCELEROMETER TO THE ROTATABLE MILL SHELL OR TO A LINER BOLT OF THE ROTATABLE MILL SHELL — 108
- CONNECTING THE AT LEAST ONE ACCELEROMETER ELECTRICALLY TO THE WIRELESS ANTENNA AND THE SIGNAL RECEIVER MODULE USING WIRES — 110
- INSTALLING THE NON-ROTATING BRACKET WITH THE PLURALITY OF MAGNETS MOUNTED TO THE BRACKET ADJACENT THE ROTATABLE MILL SHELL — 112
- CONNECTING THE WIRELESS ANTENNA AND THE RECEIVER MODULE ON THE ROTATABLE MILL SHELL TO THE POWER CONDITIONING UNIT — 114
- ATTACHING THE RADIO ANTENNA NEAR A CONTROL ROOM OF THE MILL AND WITHIN LINE-OF-SIGHT OF THE MILL TO RECEIVE SIGNALS FROM THE WIRELESS ANTENNA AND THE SIGNAL RECEIVER MODULE — 116
- ELECTRONICALLY ENGAGING THE MASTER CONTROL PROCESSOR WITH THE RADIO ANTENNA AND WITH THE DISTRIBUTED CONTROL SYSTEM OF THE AUTOGENOUS OR SEMI-AUTOGENOUS MILL AND WITH THE NETWORK ENABLING THE MASTER CONTROL PROCESSOR WITH MASTER CONTROL DATA STORAGE TO RECEIVE SIGNALS FROM THE ACCELEROMETERS AND PROCESS VARIABLES FROM THE DISTRIBUTED CONTROL SYSTEM AND FORM A PLURALITY OF SETPOINTS TO THE DISTRIBUTED CONTROL SYSTEM TO AUTOMATICALLY ADJUST FEED RATES, ROTATION OF THE ROTATABLE MILL SHELL, AND ASSOCIATED EQUIPMENT TO PREVENT OVERFILL OF THE MILL WITH THE FEED CHARGE — 118

FIGURE 6

SYSTEM TO CONTROL PARAMETERS OF A MILL

CROSS-REFERENCE TO RELATED APPLICATIONS

The current application claims priority to and the benefit of U.S. Provisional Patent Application Ser. No. 62/277,648 filed on Jan. 12, 2016, entitled "SYSTEM TO CONTROL A CHARGE VOLUME OF AN AUTOGENOUS MILL OR A SEMI-AUTOGENOUS MILL" and non-provisional patent application SYSTEM TO CONTROL A CHARGE VOLUME OF AN AUTOGENOUS MILL OR A SEMI-AUTOGENOUS MILL" Ser. No. 15/404,062. These references are hereby incorporated in their entirety.

TECHNICAL FIELD

The present invention relates generally to a system to control parameters of a grinding mill.

BACKGROUND

Ball mills, semi-autogenous (SAG) mills, autogenous (AG) mills are used for grinding ores. Automatic control of these mills is a challenge due to their size, speed, and extreme conditions. Typically, these types of mills are controlled by measuring easily measured variables, such as feed rates and motor power draw.

SUMMARY

In a first aspect, the disclosure provides a system to measure and control real-time parameters of a mill for grinding particulate without using auxiliary energy. One or more sensors are connected to a rotatable mill shell of the mill, to liner bolts of the rotatable mill shell, or both. The one or more sensors are configured to produce mill process signals. A signal transmitting and receiving module is electrically connected to the one or more sensors and are mounted to the rotatable mill shell for receiving and transmitting the mill process signals to a network. A modular power generator unit includes a non-rotating bracket mounted adjacent the rotatable mill shell; a stationary coil, including a resonant inductive coupling coil or a static electromagnetic coil, generating an electromagnetic field and mounted to the non-rotating bracket; a plurality of rotating electromagnetic coils mounted to the rotatable mill shell, each rotating electromagnetic coil of the plurality of rotating electromagnetic coils aligned to be energized with the stationary coil, each rotating electromagnetic coil of the plurality of rotating electromagnetic coils generating an AC current when energized by the electromagnetic field; and a power conditioning unit mounted to the rotatable mill shell, the power conditioning unit receiving and transforming the AC current to a DC current which supplies power to the one or more sensors and the signal transmitting and receiving module. A radio antenna receives signals from and transmits signals to the signal transmitting and receiving module. A master controller with a master control processor and a master control data storage is connected to the network and to a distributed control system to receive and use process variables from the distributed control system and the mill process signals to compute and transmit a plurality of setpoints to the distributed control system of the mill. The master control data storage includes one or more offline mill parameters measured while the mill is stationary; computer instructions to instruct the master control processor to receive the mill process signals and compare the mill process signals to the one or more offline mill parameters, the process variables, or both; and computer instructions to instruct the master control processor to provide commands to the distributed control system to alarm for upset conditions, to alter mill control variables, or both when the comparison of the mill process signals is above or below a set limit.

In a second aspect, the disclosure provides a system to determine a real time value of liner thickness of a mill for grinding particulate without using auxiliary energy. One or more sensors, including at least one accelerometer, are connected to a rotatable mill shell of the mill, to liner bolts of the rotatable mill shell, or both. The one or more sensors produce acceleration over time signals, at least one strain gauge connected to the rotatable mill shell producing strain gauge signals, or both. A signal transmitting and receiving module is electrically connected to the one or more sensors and mounted to the rotatable mill shell for receiving and transmitting the acceleration over time signals, the strain gauge signals, or both to a network. A modular power generator unit includes a non-rotating bracket mounted adjacent the rotatable mill shell; a stationary coil, comprising a resonant inductive coupling coil or a static electromagnetic coil, generating an electromagnetic field and mounted to the non-rotating bracket; a plurality of rotating electromagnetic coils mounted to the rotatable mill shell, each rotating electromagnetic coil of the plurality of rotating electromagnetic coils aligned to be energized with the stationary coil, each rotating electromagnetic coil of the plurality of rotating electromagnetic coils generating an AC current when energized by the electromagnetic field; and a power conditioning unit mounted to the rotatable mill shell, the power conditioning unit receiving and transforming the AC current to a DC current which supplies power to the one or more sensors and the signal transmitting and receiving module. A radio antenna receives signals from and transmits signals to the signal transmitting and receiving module. A master controller with a master control processor and a master control data storage is connected to the network and to a distributed control system to receive and use process variables from the distributed control system and the acceleration over time signals, the strain gauge signals, or both, to compute and transmit a plurality of setpoints to the distributed control system of the mill. The master control data storage includes stationary liner thicknesses; computer instructions to instruct the master control processor to receive the acceleration over time signals, the strain gauge signals, or both and compare the acceleration over time signals, the strain gauge signals, or both to the stationary liner thicknesses and the process variables to calculate a real time liner thickness; and computer instructions to instruct the master control processor to provide commands to the distributed control system for the mill to automatically alert the distributed control system, operators, or both, when the real time liner thickness falls below a preset level.

In a third aspect, the disclosure provides a system to control in real time a charge volume of a mill for grinding particulate, without using auxiliary energy. At least one accelerometer is connected to a rotatable mill shell of the mill or to liner bolts of the rotatable mill shell. The at least one accelerometer produces acceleration over time signals. A signal transmitting and receiving module electrically is connected to the at least one accelerometer and mounted to the rotatable mill shell for receiving and transmitting the acceleration over time signals to a network. A modular power generator unit includes a non-rotating bracket mounted adjacent the rotatable mill shell; a stationary coil, comprising a resonant inductive coupling coil or a static electromagnetic coil, generating an electromagnetic field and mounted to the non-rotating bracket; a plurality of rotating electromagnetic coils mounted to the rotatable mill shell, each rotating electromagnetic coil of the plurality of rotating electromagnetic coils aligned to be energized with the stationary coil, each rotating electromagnetic coil of the plurality of rotating electromagnetic coils generating an AC current when energized by the electromagnetic field; and a power conditioning unit mounted to the rotatable mill shell, the power conditioning unit receiving and transforming the AC current to a DC current which supplies power to the one or more sensors and the signal transmitting and receiving module. A radio antenna receives signals from and transmits signals to the signal transmitting and receiving module. A master controller with a master control processor and a master control data storage is connected to the network and to a distributed control system to receive and use process variables from the distributed control system and the acceleration over time signals to compute and transmit a plurality of setpoints to the distributed control system of the mill. The master control data storage includes preset charge limits to prevent overfill of the particulate into the mill; computer instructions to instruct the master control processor to receive the acceleration over time signals and compare the acceleration over time signals to the preset charge limits; and computer instructions to instruct the master control processor to provide commands to the distributed control system for the mill to automatically alter at least one of: a speed of the rotatable mill shell rate, a particulate feed rate, and a water feed rate when compared acceleration over time signals exceed or fall below the preset charge limits.

Further aspects and embodiments are provided in the foregoing drawings, detailed description and claims.

BRIEF DESCRIPTION OF THE DRAWINGS

The following drawings are provided to illustrate certain embodiments described herein. The drawings are merely illustrative and are not intended to limit the scope of claimed inventions and are not intended to show every potential feature or embodiment of the claimed inventions. The drawings are not necessarily drawn to scale; in some instances, certain elements of the drawing may be enlarged with respect to other elements of the drawing for purposes of illustration.

FIG. 5 shows a diagram of the steps for installation of the system according to one or more embodiments.

DETAILED DESCRIPTION

The following description recites various aspects and embodiments of the inventions disclosed herein. No particular embodiment is intended to define the scope of the invention. Rather, the embodiments provide non-limiting examples of various compositions, and methods that are included within the scope of the claimed inventions. The description is to be read from the perspective of one of ordinary skill in the art. Therefore, information that is well known to the ordinarily skilled artisan is not necessarily included.

Definitions

The following terms and phrases have the meanings indicated below, unless otherwise provided herein. This disclosure may employ other terms and phrases not expressly defined herein. Such other terms and phrases shall have the meanings that they would possess within the context of this disclosure to those of ordinary skill in the art. In some instances, a term or phrase may be defined in the singular or plural. In such instances, it is understood that any term in the singular may include its plural counterpart and vice versa, unless expressly indicated to the contrary.

As used herein, the singular forms "a," "an," and "the" include plural referents unless the context clearly dictates otherwise. For example, reference to "a substituent" encompasses a single substituent as well as two or more substituents, and the like.

As used herein, "for example," "for instance," "such as," or "including" are meant to introduce examples that further clarify more general subject matter. Unless otherwise expressly indicated, such examples are provided only as an aid for understanding embodiments illustrated in the present disclosure and are not meant to be limiting in any fashion. Nor do these phrases indicate any kind of preference for the disclosed embodiment.

The present embodiments generally relate to a system to monitor parameters of ball, AG, and SAG mills for grinding particulates, such as ores, while the mill is in operation.

The term "semi-autogenous grinding mill" or SAG mill as used herein can refer to an essentially autogenous mill but utilize grinding balls to aid in grinding like in a ball mill inside a rotatable mill liner. A SAG mill is generally used as a primary or first stage grinding solution. SAG mills can use a ball charge of 8 percent to 21 percent, typically. As an example, a large SAG mill may be about 42 feet in diameter, powered by a 28 MW (38,000 HP) motor. As another example, a SAG mill with a 44 foot diameter may be used and powered by a 35 MW (47,000 HP) motor. Attrition between grinding balls and ore particles causes grinding of finer particles. SAG mills are characterized by their large diameter and short length as compared to ball mills. The inside of the SAG mill can be lined with lifting plates to lift the material inside the mill, where it then falls off the plates onto the rest of the ore charge. SAG mills are primarily used at gold, copper and platinum mines with applications also in lead, zinc, silver, alumina and nickel, among others.

One embodiment describes a system to monitor in real time a charge volume of an AG, SAG, or ball mill and provide liner wear information without using auxiliary energy, and controls the charge volume as the charge volume enters the mill to prevent overfill as well as provide real time or near real time liner wear information of the mill.

The AG mill, SAG mill, or ball mill will have a feed inlet for flowing feed particulate into the mill. The feed particulate is also known as "the charge" in the mining and milling industries.

Mills may have a rotatable mill shell, which may have liner bolts that penetrate through the rotatable mill shell. In some embodiments, lifting plates are used for lifting particulate within the rotatable mill liner. These mill liners wear over time and need to be replaced from time to time due to the abrasion of the ore. Ore abrasiveness varies overtime.

In some embodiments, the system uses one or more accelerometers and/or strain gauges directly welded onto or otherwise connected to the rotatable mill shell, each accelerometer producing an acceleration over time signal.

In some embodiments, the one or more accelerometers are connected to a wireless antenna and a signal receiver module, which may be directly connected onto the rotatable mill shell.

In some embodiments, the system on the rotatable mill shell is powered by a power conditioning unit, part of which may be mounted to the rotatable mill shell and part of which may be mounted to a fixed bracket adjacent the rotatable mill shell. In some embodiments, the power conditioning unit is a modular magnetic field, resonant inductive coupling field, or other electromagnetic field based power generator unit.

In some embodiments, the wireless antenna, the signal receiver module, or both the wireless antenna and the signal receiver module are a computer or a central processing unit.

In some embodiments, a radio antenna is mounted to the rotatable mill shell and is used for communicating the signals from the wireless antenna and the signal receiver module to a master control processor with a master control data storage that may also be connected to a network as well as to a distributed control system of the mill.

In some embodiments, the master control processor uses preset charge limits to prevent overfill of ore into the mill. The preset charge limits can be stored in a connected master control data storage as well as computer instructions that can instruct the master control processor to (i) receive the acceleration over time signals from the radio antenna, (ii) compare the acceleration over time signals to the preset charge limits, and (iii) provide commands to a distributed control system for the mill to enable the distributed control system to automatically alter at least one of: speed of the rotatable mill shell, particulate feed rate, and water feed rate when the compared acceleration over time signals exceed or fall below the preset charge limits.

In some embodiments, the master control processor can be a computer or a central processing unit.

Rotatable liners allow the particulate, (known in the industry as particulate charge) such as iron ore, to rotate, then internal lifter plates of the rotatable liner raise the ore up and produce the grinding of the initial charge of ore. Slots can be provided within the mill which can allow ground particulate to exit the mill when particulate reaches an appropriate size.

Particulate charge can be harder or more or less abrasive than expected, causing a longer residence and/or more or less abrasion and wear over time in the mill than expected and if equipment is not adjusted the feed charge causes the mill to overfill, burn out motors and cause environmental spills.

The present invention is designed to provide real time monitoring, real time alarms, and real time information to the distributed control system of the mill, along with client devices connected to a network, enabling the mill to automatically adjust the water feed rates, the charge feed rates, the spin of the rotatable mill liner, and other variables known to someone of ordinary skill in the art, while also alerting operators that changes are required at a certain mill to prevent damage or even death of nearby workers if the mill explodes due to particulate back up.

The system manages and optimizes throughput for the mill and optimizes liner life.

One embodiment of the present invention is designed to provide real time monitoring of liner wear. Data from the sensors, accelerometers, strain gauges, and other instruments, plant process data (ore flow, mill usage, etc.) and laser scans from the plant are used to create offline models of the liner wear. These models are then used to in online mode and are updated with plant data as the mill operates for an accurate mill wear measurement.

Accelerometers are not strain gauges and provide different measurements.

The system enables inductive transfer of energy for monitoring feed charge volumes of particulates entering the mill to prevent mill overflow.

In one embodiment, the real time monitoring and alarm system of the invention requires no additional power to operate, extends liner life, and provides critical liner wear information to extend the time in between liner change outs and has several benefits, such as the prevention of death or injury of maintenance personnel by reducing the amount of time maintenance personnel are required to work in dangerous confined space environments.

Another benefit of the system is that the system stops environmental harm by using less electrical power for ore grinding by lowering specific energy consumption by the mill and by carefully controlling feed rates and materials used for feed rates.

Another benefit of the system is that the system stops environmental harm by using less metal for ore grinding by lowering specific metal consumption by the mill.

Another benefit of the system is that the system prevents fires by requiring less use of dangerous welding and cutting of metal parts for repair of liners and installation on liners.

Still another benefit of the system is that the system prevents explosions by requiring less use of dangerous welding equipment and less cutting of metal parts for the mill.

Yet another benefit of the system is that the system prevents dismemberment of mill workers by extending the life of the mill liners which requires less labor inside the dangerous interior of the mill.

Additionally, the system improves mill throughput by more efficiently targeting the ore charge inside the mill to fall upon itself for more efficient particle breakage.

The term "set points" as used herein can refer to an action by the master control processor using process variables supplied by the distributed control system of the mill to generate ideal set points to maximize feed throughput without overfilling the mill.

The term "data storage" as used herein refers to a non-transitory computer readable medium, such as a hard disk drive, solid state drive, flash drive, tape drive, and the like. The term "non-transitory computer readable medium" excludes any transitory signals but includes any non-transitory data storage circuitry, e.g., buffers, cache, and queues, within transceivers of transitory signals.

The term "electromagnetic coils" as used herein can refer to a plurality of coils, wherein each coil can have windings that when energized by one or more magnetic or electromagnetic fluxes/fields to generate an AC or DC current.

The term "magnets" as used herein can refer to a rare earth magnet. In some embodiments, each magnet or plurality of magnets can be a member of the group: a neodymium magnet, a samarium cobalt magnet, a ceramic magnet, and combinations thereof. In some embodiments, each magnet of the plurality of magnets can be of a geometric shape including but not limited to a ring, a cube, a sphere, a wedge, or a rectangle. In some embodiments, the magnets can be dog boned shaped. Usable magnets, for example, can be similar to magnets which can be obtained from CMS Magnetics of Garland Texas. The term "magnets" may also refer to electromagnets.

The term "magnetic flux" as used herein can refer to the magnetic field generated by individual magnets.

The term "particulate" as used herein can refer to but is not limited to ore or ground particles, such as for smelting or for use in roadways.

The term "processor" as used herein can refer to a computer or a programmable logic controller (PLC).

The terms "radio antenna" and "wireless antenna" as used herein can refer to a bidirectional antenna that can receive and transmit radio signals, such as a Wi-Fi antenna.

The term "without using auxiliary energy" as used herein can refer to the condition that the system only uses the preexisting spin of the rotatable mill shell along with magnets or electromagnet coils or resonant coils to create power to operate the system.

Figure 1:
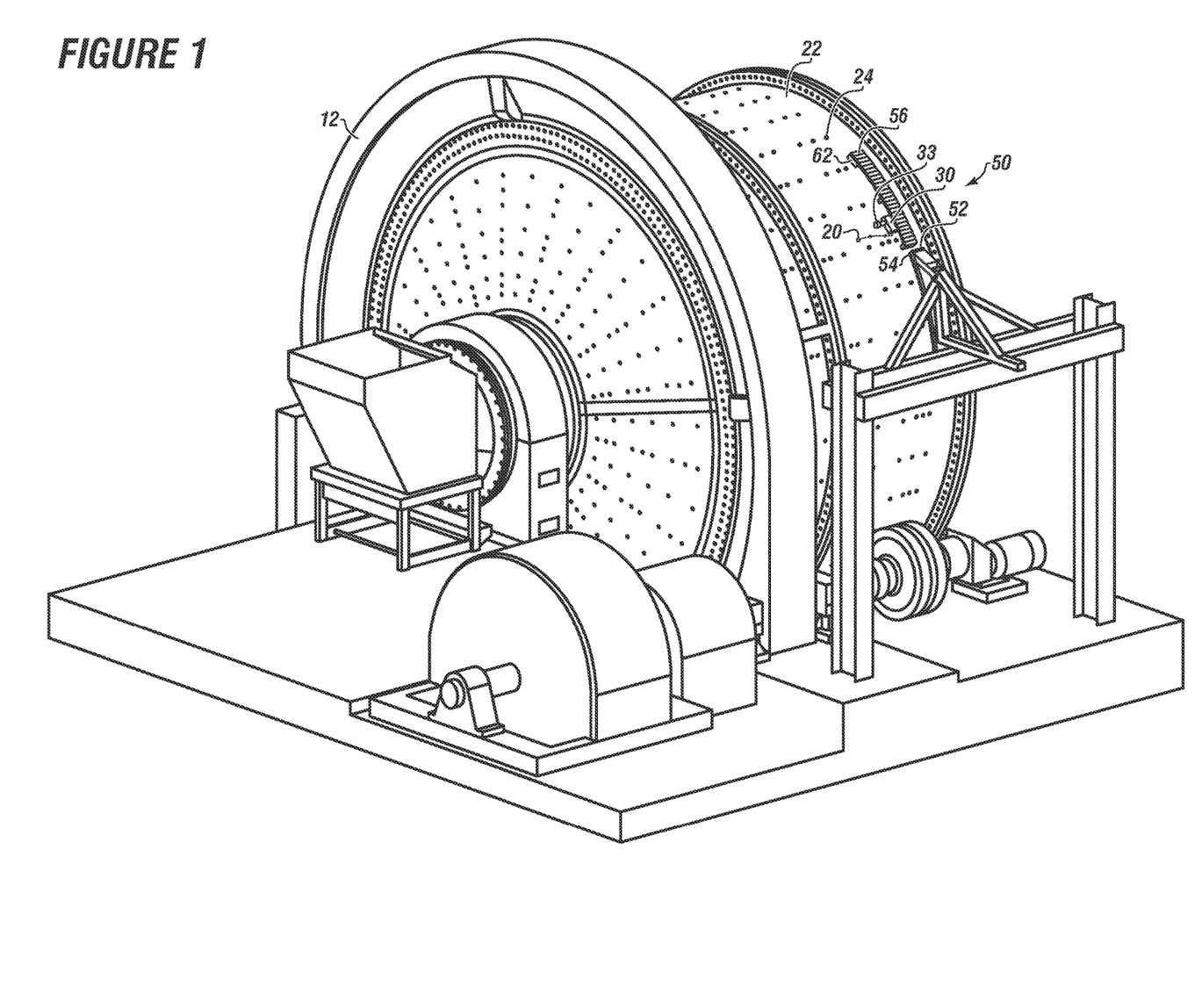
FIG. 1 shows a perspective view of an autogenous mill, ball mill, or a semi-autogenous mill according to one or more embodiments.

Turning now to the Figures, FIG. 1 shows a perspective view of a mill according to one embodiment of the present invention. The mill 12 may be an AG mill or a SAG mill. The mill 12 has a rotatable mill shell 22 and liner bolts 24. Parts of a modular magnetic power generating unit 50 are attached to and adjacent the rotatable mill shell 22. The modular magnetic power generating unit 50 has at least one magnet 54 of a plurality of magnets connected to a non-rotating bracket 52. The non-rotating bracket 52 is mounted adjacent the rotatable mill shell 22. The modular magnetic power generating unit 50 has a power conditioning unit 62, which is mounted to the rotatable mill shell 22. The power conditioning unit 62 is configured to receive an AC current from at least one rotating electromagnetic coil 56 of a plurality of rotating electromagnetic coils. The at least one rotating electromagnetic coil 56 is aligned to be energized by at least one magnet 54 when the rotatable mill shell 22 rotates. The power conditioning unit 62 transforms AC current to DC current. The DC current is used to power a wireless antenna 33 and a signal receiver module 30. The signal receiver module 30, containing the wireless antenna 33 in this embodiment, is attached to the rotatable mill shell 22. The wireless antenna may be attached to the signal receiver module 30 or directly to the rotatable mill shell 20. At least one accelerometer 20 is connected to the rotatable mill shell 20. In other embodiments, the accelerometer is connected to at least one of the liner bolts 24 of the mill 12.

Figure 2:
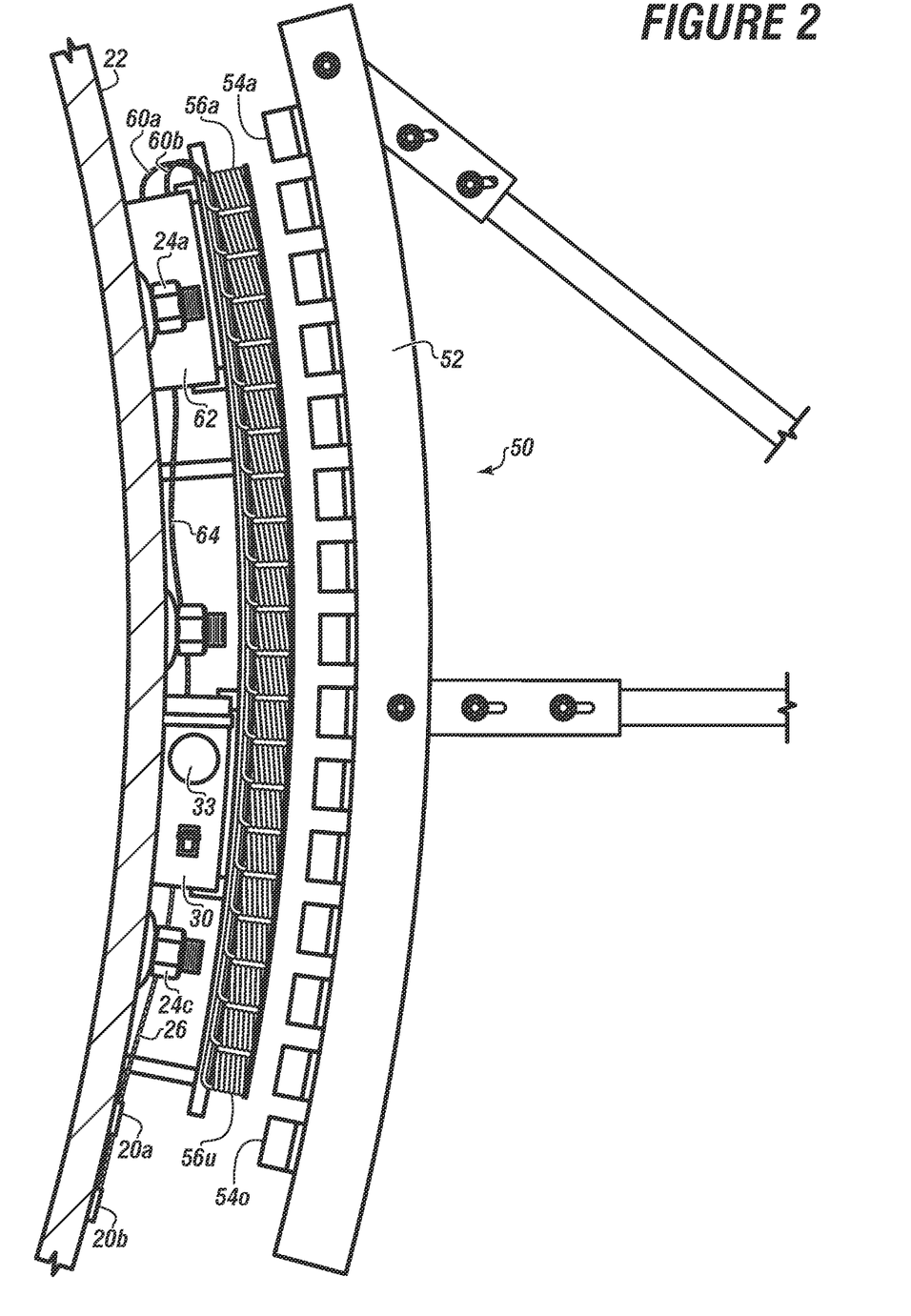
FIG. 2 is a side view of a modular magnetic, resonant inductive coupling or electromagnetic field based power generating unit according to one or more embodiments.

FIG. 2 shows a side view of the modular power generating unit according to one embodiment of the present invention. The modular power generating unit 50 has a power conditioning unit 62 to receive AC current 60a and 60b from at least one rotating electromagnetic coil of the plurality of magnetic coils 56a-56u. While twenty-one rotating electromagnetic coils 56a-56u are shown, any number of rotating electromagnetic coils can be used, depending upon application. The plurality of rotating electromagnetic coils 56a-56u produce AC current 60a and 60b when at least one rotating electromagnetic coil of the plurality of rotating electromagnetic coils 56a-56u is energized by passing at least one magnet or coil of the plurality of magnets or coils 54a-54o, which can be attached to the non-rotating bracket 52 as the rotatable mill shell 22 rotates. While fifteen magnets or coils 54a-54o are shown, any number of magnets or coils may be attached to the non-rotating bracket 52, depending upon application. Each magnet or coil of the plurality of magnets or coils 54a-54o may be a rare earth magnet or an electromagnet or an inductive resonant coil. In this embodiment, each magnet is a neodymium magnet, a samarium cobalt magnet, a ceramic magnet, or combinations thereof. In this embodiment, the plurality of magnets are mounted in a linear sequence. In other embodiments, the magnets may be grouped into sets of magnets. Each magnet generates a magnetic flux. Each rotating electromagnetic coil is depicted to be aligned and to be energized with the plurality of magnets as each rotating electromagnetic coil is spun under the magnets as the rotatable mill shell rotates. Each rotating electromagnetic coil generates AC current which is combined into one AC current or multiple AC currents when energized by the plurality of magnetic fluxes. The power conditioning unit 62 transforms AC current 60a and 60b to DC current 64 generated by the plurality of rotating electromagnetic coils and then transfers the DC current for use. The DC current is used to power the signal receiver module 30, the wireless antenna 33, or both the signal receiver module and the wireless antenna. The DC current produced may be from 1 volt to 24 volts. The signal receiver module 30 receives acceleration over time signals 26 from the at least one accelerometer 20a and 20b. More than one accelerometer may be used to send the acceleration over time signals 26 to the signal receiver module 30. If more than one accelerometer is used, the accelerometers may be connected in parallel, in series, or combinations thereof. The accelerometers 20a and 20b are attached to the rotatable mill shell 22. In some embodiments, they are attached to the liner bolts 24a-24c.

Figure 3:
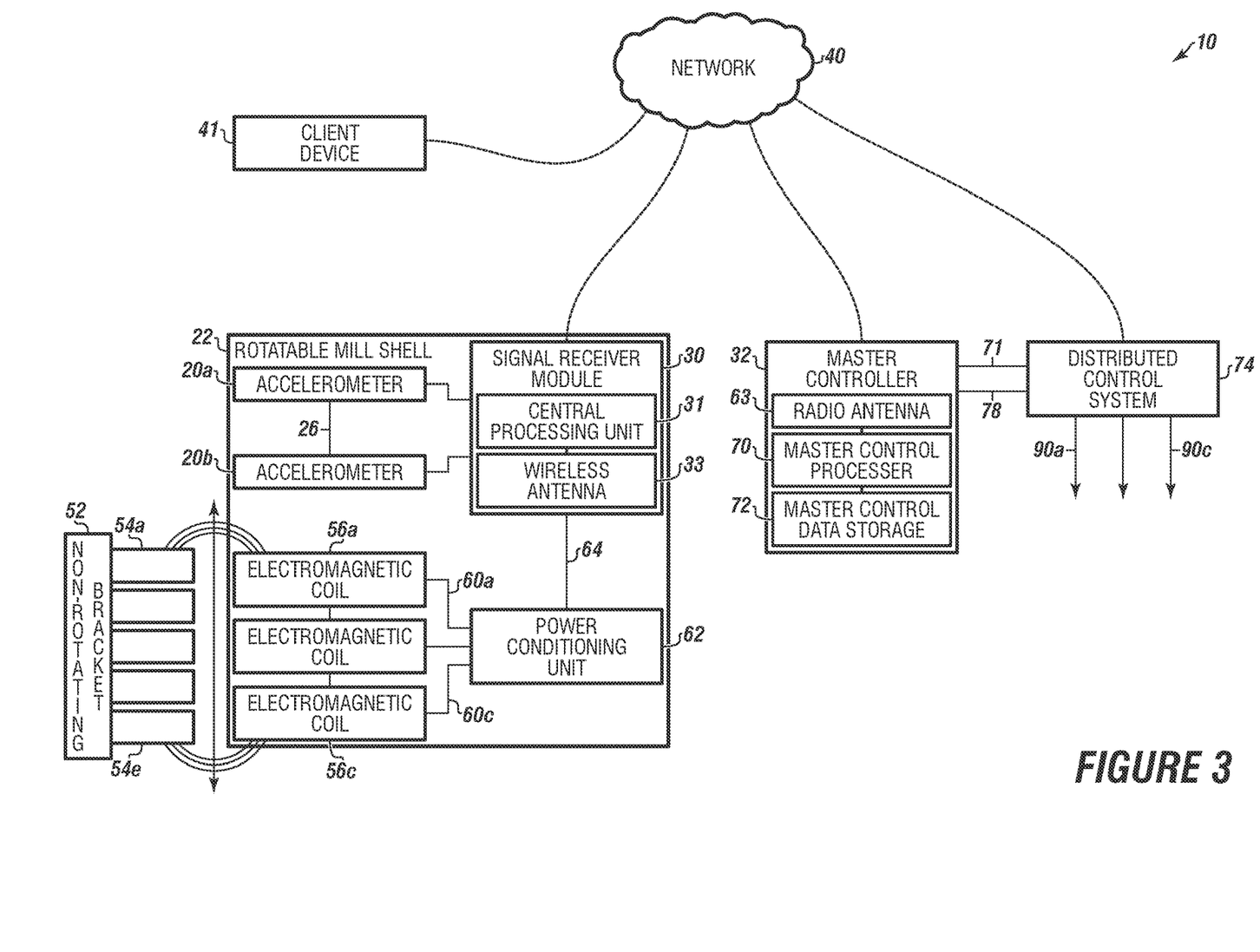
FIG. 3 shows a diagram of the assembled system according to one or more embodiments.

FIG. 3 shows a diagram of the assembled system according to one or more embodiments.

The system 10 can include the plurality of rotating electromagnetic coils 56a-56c, which is shown, attached to the rotatable mill shell 22. The plurality of rotating electromagnetic coils 56a-56c can become energized and produce AC current 60a-60c as they rotate past the plurality of magnets, electromagnets or resonant inductive coils 54a-54e, which can be attached to the non-rotating bracket 52, which is shown adjacent the rotatable mill shell.

The power conditioning unit 62 can transform the AC current 60a-60c into DC current 64 and send the DC current to provide power to the signal receiver module 30.

The signal receiver module 30 can receive acceleration over time signals 26 from the at least one accelerometer 20a-20b and transmit the acceleration over time signals 26 to a network 40 using a central processing unit 31 and a wireless antenna 33. The central processing unit 31, the wireless antenna 33 or both the central processing unit and the wireless antenna can be configured to receive transmissions from the network 40.

In embodiments, the network 40 can be at least one of: a local area network, a wide area network, a global communication network, a satellite network, a cellular network, a similar network, or combinations thereof.

A master controller 32 can be connected to the network 40 and can contain a radio antenna 63, a master control processor 70, and a master control data storage 72. In embodiments, the radio antenna 63 can be connected to the master controller 32.

The radio antenna 63 can receive signals via the network 40 from the wireless antenna 33 of the signal receiver module 30.

The master control processor 70 can be in communication with the master control data storage 72. The master control processor 70 can be connected to the network 40 and to a distributed control system 74 for the autogenous mill or the semi-autogenous mill.

The a master control processor 70 can receive and use process variables 71 from the distributed control system 74 and can receive and use the acceleration over time signals 26 to compute and transmit a plurality of setpoints 78 to the distributed control system 74.

In embodiments, examples of the plurality of setpoints can be rotational speed of the rotatable mill shell, such as a number of rotations per minute for the mill that has a rotatable mill shell, a water feed rate, such as a number of gallons per minute for the mill, a particulate feed rate, which can vary from the number of tons per hour of particulate, such as iron ore, into the mill, or combinations thereof.

At least one client device 41 can be connected to the network 40, which can enable an operator to receive alarms or information about mill processing conditions. The client device can be a computer, a laptop, a cellular phone, a tablet computer, a similar computing device, or combinations thereof.

The distributed control system 74 can transmit manipulated variables 90a-90c, such as new rotational speeds, new water feeds rates, new particulate feeds rates, new rotational speeds, or combinations thereof, to the system or actual components of the autogenous mill or the semi-autogenous mill.

Figure 4:
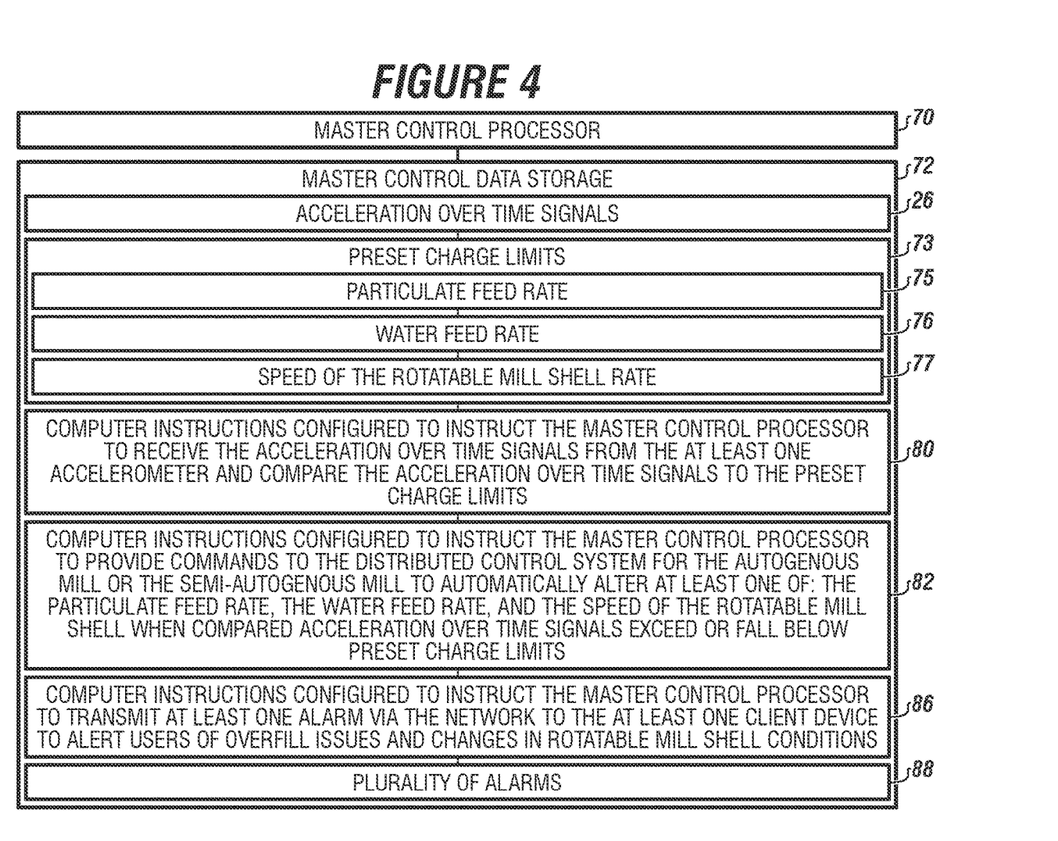
FIG. 4 shows a diagram of a master control processor and a master control data storage according to one or more embodiments.

FIG. 4 shows a diagram of a master control processor and a master control data storage according to one or more embodiments.

In embodiments, the master control processor 70 and the master control data storage 72 can be in communication with one another.

Acceleration over time signals 26 can be stored in the master control data storage 72 for use in generating alarms, or use in generating a log of changes to the distributed control system of the autogenous mill or the semi-autogenous mill.

The master control data storage 72 can contain preset charge limits 73 to prevent overfills of particulate, such as ore into the autogenous mill or the semi-autogenous mill.

The preset charge limits 73 can include but are not limited to a particulate feed rate 75, a water feed rate 76, and the speed of the rotatable mill shell rate 77.

The master control data storage 72 can contain computer instructions 80 configured to instruct the master control processor to receive the acceleration over time signals from the at least one accelerometer and compare the acceleration over time signals to the preset charge limits.

The master control data storage 72 can contain computer instructions 82 configured to instruct the master control processor to provide commands to the distributed control system for the autogenous mill or the semi-autogenous mill to automatically alter at least one of: the particulate feed rate, the water feed rate, and the speed of the rotatable mill shell when compared acceleration over time signals exceed or fall below preset charge limits.

The master control data storage 72 can contain computer instructions 86 configured to instruct the master control processor to transmit at least one alarm via the network to the at least one client device to alert users of overfill issues and changes in rotatable mill shell conditions.

A plurality of alarms 88 can be stored in the master control data storage 72 for viewing historically and to facilitate maintenance on the autogenous mill or the semi-autogenous mill.

FIG. 5 shows a diagram of the method for installation of the system according to one or more embodiments.

The method for installation of the system can include installing onto the rotatable mill shell a plurality of bracket hangers, each bracket hanger connected to a mill flange bolt that is preexisting on the rotatable mill shell, as illustrated in step 100.

In embodiments, the bracket hangers can be attached in any manner suitable for application, such as by welding.

The method for installation of the system can include installing a bracket with the at least one rotating electromagnetic coil mounted thereto to the bracket hangers on the rotatable mill shell, as illustrated by step 102.

The method for installation of the system can include attaching the power conditioning unit to the bracket, as illustrated by step 104.

The method for installation of the system can include attaching the wireless antenna and the signal receiver module to the bracket, as illustrated by step 106.

The method for installation of the system can include installing the at least one accelerometer to the rotatable mill shell or to a liner bolt of the rotatable mill shell, as illustrated by step 108.

The method for installation of the system can include connecting the at least one accelerometer electrically to the wireless antenna and the signal receiver module using wires, as illustrated by step 110.

The method for installation of the system can include installing the non-rotating bracket with the plurality of magnets mounted to the bracket adjacent the rotatable mill shell, as illustrated by step 112.

In embodiments, the non-rotating bracket with the plurality of magnets mounted the bracket adjacent the rotation mill shell can be mounted from % of an inch to 1 inch from the rotatable mill shell.

The method for installation of the system can include connecting the wireless antenna and the receiver module on the rotatable mill shell to the power conditioning unit, as illustrated by step 114.

The method for installation of the system can include attaching the radio antenna near a control room of the mill and within line-of-sight of the mill to receive signals from the wireless antenna and the signal receiver module, as illustrated by step 116.

The method for installation of the system can include electronically engaging the master control processor with the radio antenna and with the distributed control system of the autogenous or semi-autogenous mill and with the network enabling the master control processor with master control data storage to receive signals from the accelerometers and process variables from the distributed control system and form a plurality of setpoints to the distributed control system to automatically adjust feed rates, rotation of the rotatable mill shell, and associated equipment to prevent overfill of the mill with the feed charge, as illustrated by step 118.

While these embodiments have been described with emphasis on the embodiments, it should be understood that within the scope of the appended claims, the embodiments might be practiced other than as specifically described herein.

All patents and published patent applications referred to herein are incorporated herein by reference. The invention has been described with reference to various specific and preferred embodiments and techniques. Nevertheless, it is understood that many variations and modifications may be made while remaining within the spirit and scope of the invention.

Figure 6:
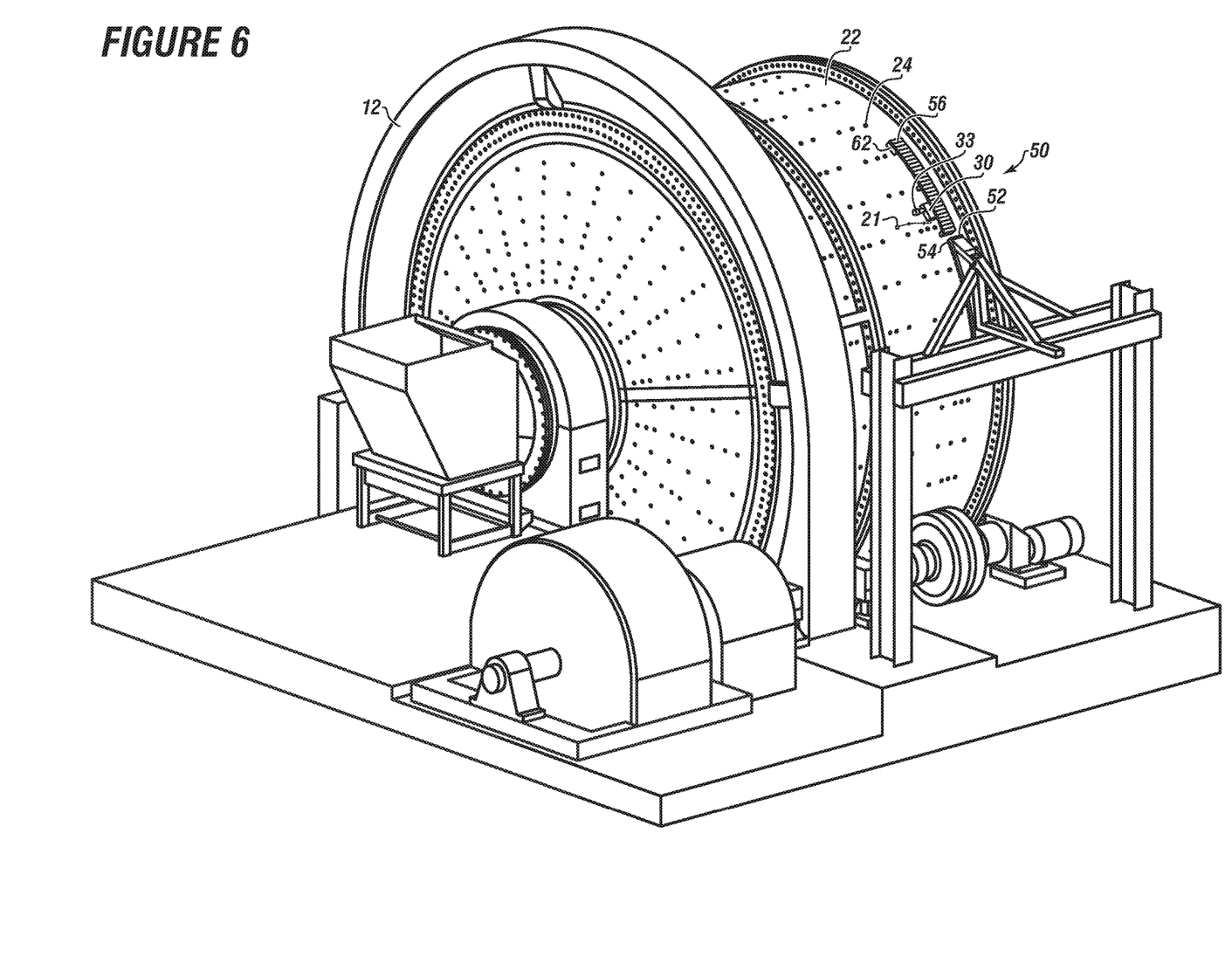
FIG. 6 shows a perspective view of an autogenous mill, ball mill, or a semi-autogenous mill according to one or more embodiments.

FIG. 6 shows an isometric view of a mill with a system to measure and control real-time parameters of the mill for grinding particulate without using auxiliary energy that may be used in one embodiment of the present invention. The system consists of a sensor 21 connected to a rotatable mill shell 22 of the mill 12. In other embodiments, the sensor 21 may be connected to liner bolts 24 of the rotatable mill shell. In other embodiments, more than one sensor 21 may be included and connect to either the rotable mill shell 22, the liner bolts 24, or both. The sensor 21 is configured to produce mill process signals. A signal transmitting and receiving module, 33 and 30, is electrically connected to the sensor 21 and is mounted to the rotatable mill shell 22 for receiving and transmitting the mill process signals to a network.

A modular power generator unit 50 consists of several components. First, a non-rotating bracket 52 is mounted adjacent the rotatable mill shell 22. Second, stationary coils 54, consisting of resonant inductive coupling coils or static electromagnetic coils, generates an electromagnetic field and is mounted to the non-rotating bracket 52. Third, a plurality of rotating electromagnetic coils 56 are mounted to the rotatable mill shell 22. Each rotating electromagnetic coil of the plurality of rotating electromagnetic coils 56 are aligned to be energized with the stationary coils, each rotating electromagnetic coil of the plurality of rotating electromagnetic coils 56 generating an AC current when energized by the electromagnetic field. Fourth, a power conditioning unit 62 is mounted to the rotatable mill shell. The power conditioning unit 62 receives and transforms the AC current to a DC current which supplies power to the sensor 21 and the signal transmitting and receiving module 33 and 30.

The following description is similar to that for FIG. 3. A radio antenna receives signals from and transmits signals to the signal transmitting and receiving module. A master controller has a master control processor and a master control data storage connected to the network and to a distributed control system. The master controller receives and uses process variables from the distributed control system and the mill process signals to compute and transmit a plurality of setpoints to the distributed control system of the mill. The master control data storage consists of one or more offline mill parameters measured while the mill is stationary, computer instructions to instruct the master control processor to receive the mill process signals and compare the mill process signals to the one or more offline mill parameters, the process variables, or both, and computer instructions to instruct the master control processor to provide commands to the distributed control system to alarm for upset conditions, to alter mill control variables, or both when the comparison to the mill process signals is above or below a set limit.

In one embodiment, the real-time parameters consist of a charge volume of the mill. The one or more sensors may consist of at least one accelerometer and the mill process signals consist of acceleration over time signals. The one or more sensors may consist of at least one strain gauge and the mill process signals may consist of strain gauge signals. Or, the one or more sensors may consist of at least one accelerometer and at least one strain gauge, and the mill process signals consist of both acceleration over time signals and strain gauge signals. The one or more offline mill parameters are preset charge limits to prevent overfill of the particulate into the mill. The mill control variables altered are selected from the group consisting of a speed of the rotatable mill shell rate, a particulate feed rate, a water feed rate, and combinations thereof.

In one embodiment, the real-time parameters consist of liner thickness of the mill. The one or more sensors may consist of at least one accelerometer and the mill process signals consist of acceleration over time signals. The one or more sensors may consist of at least one strain gauge and the mill process signals may consist of strain gauge signals. Or, the one or more sensors may consist of at least one accelerometer and at least one strain gauge, and the mill process signals consist of both acceleration over time signals and strain gauge signals. The one or more offline mill parameters are stationary liner thickness. The alarm for upset conditions is an alarm that liner thickness is below a preset thickness.

In one embodiment, the real-time parameters consist of ball charge in the mill, the ratio of ball to ore charge in the mill, or both. The one or more sensors may consist of at least one accelerometer and the mill process signals consist of acceleration over time signals. The one or more sensors may consist of at least one strain gauge and the mill process signals may consist of strain gauge signals. Or, the one or more sensors may consist of at least one accelerometer and at least one strain gauge, and the mill process signals consist of both acceleration over time signals and strain gauge signals. The one or more offline mill parameters are the feed rate to the mill, the ball charge rate, and the mill power consumption. The mill control variables altered are selected from the group consisting of the ball charge rate, a particulate feed rate, a water feed rate, and combinations thereof.

What is claimed is:

1. A system to control in real time a charge volume of a mill for grinding particulate, without using auxiliary energy, the system comprising:

at least one accelerometer connected to a rotatable mill shell of the mill or to liner bolts of the rotatable mill shell, the at least one accelerometer producing acceleration over time signals;

a signal transmitting and receiving module electrically connected to the at least one accelerometer and mounted to the rotatable mill shell for receiving and transmitting the acceleration over time signals to a network;

a modular power generator unit comprising:
  a non-rotating bracket mounted adjacent the rotatable mill shell;
  a stationary coil, comprising a resonant inductive coupling coil or a static electromagnetic coil, generating an electromagnetic field and mounted to the non-rotating bracket;
  at least one rotating electromagnetic coil mounted to the rotatable mill shell, the at least one rotating electromagnetic coil aligned to be energized with the stationary coil, the at least one rotating electromagnetic coil generating an AC current when energized by the electromagnetic field; and
  a power conditioning unit mounted to the rotatable mill shell, the power conditioning unit receiving and transforming the AC current to a DC current which supplies power to the one or more sensors and the signal transmitting and receiving module;

a radio antenna for receiving signals from and transmitting signals to the signal transmitting and receiving module;

a master controller with a master control processor and a master control data storage connected to the network and to a distributed control system to receive and use process variables from the distributed control system and the acceleration over time signals to compute and transmit a plurality of setpoints to the distributed control system of the mill, the master control data storage comprising:

preset charge limits to prevent overfill of the particulate into the mill;
computer instructions to instruct the master control processor to receive the acceleration over time signals and compare the acceleration over time signals to the preset charge limits; and
computer instructions to instruct the master control processor to provide commands to the distributed control system for the mill to automatically alter at least one of: a speed of the rotatable mill shell rate, a particulate feed rate, and a water feed rate when compared acceleration over time signals exceed or fall below the preset charge limits.

2. The system of claim 1, further comprising at least one client device connected to the network to receive information from the master control processor when the plurality of setpoints are transmitted to the distributed control system.

3. The system of claim 1, comprising from 1 accelerometer to 50 accelerometers electrically connected in parallel with the wireless antenna and the signal receiver module.

4. The system of claim 1, wherein the mill is selected from the group consisting of ball mills, semi-autogenous mills, and autogenous mills.

5. The system of claim 1, wherein the preset charge limits comprise:
the speed of the rotatable mill shell rate in rotations per minute;
the particulate feed rate; and
the water feed rate.

6. The system of claim 1, wherein the stationary coil is the static electromagnetic coil and the static electromagnetic coil has from 200 windings to 2000 windings.

7. The system of claim 1, wherein the at least one rotating electromagnetic coil has from 200 windings to 2000 windings.

8. The system of claim 1, wherein the signal transmitting and receiving module is a computer or a central processing unit.

9. The system of claim 1, wherein the master control processor is a computer or a central processing unit.

10. The system of claim 1, wherein the network is at least one of: a local area network, a wide area network, a global communication network, a satellite network, and a cellular network, or combinations thereof.

11. The system of claim 1, comprising computer instructions to instruct the master control processor to transmit at least one alarm via the network to the at least one client device to alert users of overfill issues and changes in the rotatable mill shell conditions.

12. The system of claim 1, wherein the master controller is connected to a radio antenna.

13. The system of claim 1 comprising:
at least one strain gauge connected to the mill or to liner bolts of the rotatable mill shell and producing a deflection over time signal for the mill;
computer instructions to instruct the master control processor to receive the deflection over time signals and compare the deflection over time signals to the preset charge limits;
computer instructions to instruct the master control processor to provide commands to the distributed control system for the mill to automatically alter at least one of: a speed of the rotatable mill shell rate, a particulate feed rate, and a water feed rate when compared deflection over time signals exceed or fall below the preset charge limits.

14. The system of claim 13, comprising from 1 strain gauge to 50 strain gauges electrically connected in parallel with the wireless antenna and the signal receiver module.

15. The system of claim 1, wherein the master controller is configured to determine a real time value of liner thickness of the mill using a liner model in the master control data storage, wherein the liner model is configured to:
receive first sensed information from a liner thickness measurement device that measures liner wear when inserted into the mill when the mill is not rotating;
use the first sensed information as a baseline for the real time value of liner thickness;
receive second sensed information from one or more sensors while the mill is rotating, the one or more sensors comprising at least one strain gauge connected to the rotatable mill shell, the at least one accelerometer, or both; and
compare the second sensed information to the first sensed information, compute the real time value of liner thickness, and provide an alert when the real time value of liner thickness falls below preset levels.

16. A system to determine a real time value of liner thickness of a mill for grinding particulate without using auxiliary energy, the system comprising:
one or more sensors comprising at least one accelerometer connected to a rotatable mill shell of the mill, to liner bolts of the rotatable mill shell, or both producing acceleration over time signals, at least one strain gauge connected to the rotatable mill shell producing strain gauge signals, or both;
a signal transmitting and receiving module electrically connected to the one or more sensors and mounted to the rotatable mill shell for receiving and transmitting the acceleration over time signals, the strain gauge signals, or both to a network;
a modular power generator unit comprising:
a non-rotating bracket mounted adjacent the rotatable mill shell;
a stationary coil, comprising a resonant inductive coupling coil or a static electromagnetic coil, generating an electromagnetic field and mounted to the non-rotating bracket;
at least one rotating electromagnetic coil mounted to the rotatable mill shell, the at least one rotating electromagnetic coil aligned to be energized with the stationary coil, the at least one rotating electromagnetic coil generating an AC current when energized by the electromagnetic field; and
a power conditioning unit mounted to the rotatable mill shell, the power conditioning unit receiving and transforming the AC current to a DC current which supplies power to the one or more sensors and the signal transmitting and receiving module;
a radio antenna for receiving signals from and transmitting signals to the signal transmitting and receiving module;
a master controller with a master control processor and a master control data storage connected to the network and to a distributed control system to receive and use process variables from the distributed control system and the acceleration over time signals, the strain gauge signals, or both, to compute and transmit a plurality of setpoints to the distributed control system of the mill, the master control data storage comprising:
stationary liner thicknesses;
computer instructions to instruct the master control processor to receive the acceleration over time signals, the strain gauge signals, or both and compare the acceleration over time signals, the strain gauge signals, or both to the stationary liner thicknesses and the process variables to calculate a real time liner thickness; and computer instructions to instruct the master control processor to provide commands to the distributed control system for the mill to automatically alert the distributed control system, operators, or both, when the real time liner thickness falls below a preset level.

17. A system to measure and control real-time parameters of a mill for grinding particulate without using auxiliary energy, the system comprising:
one or more sensors connected to a rotatable mill shell of the mill, to liner bolts of the rotatable mill shell, or both and configured to produce mill process signals;
a signal transmitting and receiving module electrically connected to the one or more sensors and mounted to the rotatable mill shell for receiving and transmitting the mill process signals to a network;
a modular power generator unit comprising:
  a non-rotating bracket mounted adjacent the rotatable mill shell;
  a stationary coil, comprising a resonant inductive coupling coil or a static electromagnetic coil, generating an electromagnetic field and mounted to the non-rotating bracket;
  at least one rotating electromagnetic coil mounted to the rotatable mill shell, the at least one rotating electromagnetic coil aligned to be energized with the stationary coil, the at least one rotating electromagnetic coil generating an AC current when energized by the electromagnetic field; and
  a power conditioning unit mounted to the rotatable mill shell, the power conditioning unit receiving and transforming the AC current to a DC current which supplies power to the one or more sensors and the signal transmitting and receiving module;
a radio antenna for receiving signals from and transmitting signals to the signal transmitting and receiving module; and
a master controller with a master control processor and a master control data storage connected to the network and to a distributed control system to receive and use process variables from the distributed control system and the mill process signals to compute and transmit a plurality of setpoints to the distributed control system of the mill, the master control data storage comprising:
one or more offline mill parameters measured while the mill is stationary;
computer instructions to instruct the master control processor to receive the mill process signals and compare the mill process signals to the one or more offline mill parameters, the process variables, or both; and
computer instructions to instruct the master control processor to provide commands to the distributed control system to alarm for upset conditions, to alter mill control variables, or both when the comparison to the mill process signals is above or below a set limit.

18. The system of claim 17, wherein:
the real-time parameters comprise a charge volume of the mill;
the one or more sensors comprise at least one accelerometer and the mill process signals comprise acceleration over time signals, the one or more sensors comprise at least one strain gauge and the mill process signals comprise strain gauge signals, or both;
the one or more offline mill parameters are preset charge limits to prevent overfill of the particulate into the mill; and
the mill control variables altered are selected from the group consisting of a speed of the rotatable mill shell rate, a particulate feed rate, a water feed rate, and combinations thereof.

19. The system of claim 17, wherein:
the real-time parameters comprise liner thickness of the mill;
the one or more sensors comprise at least one accelerometer and the mill process signals comprise acceleration over time signals, the one or more sensors comprise at least one strain gauge and the mill process signals comprise strain gauge signals, or both;
the one or more offline mill parameters are stationary liner thickness; and
the alarm for upset conditions is an alarm that liner thickness is below a preset thickness.

20. The system of claim 17, wherein:
the real-time parameters comprise ball charge in the mill, the ratio of ball to ore charge in the mill, or both;
the one or more sensors comprise at least one accelerometer and the mill process signals comprise acceleration over time signals, the one or more sensors comprise at least one strain gauge and the mill process signals comprise strain gauge signals, or both;
the one or more offline mill parameters are the feed rate to the mill, the ball charge rate, and the mill power consumption; and
the mill control variables altered are selected from the group consisting of the ball charge rate, a particulate feed rate, a water feed rate, and combinations thereof.

* * * * *